United States Patent
Satbhaiya et al.

(10) Patent No.: US 11,451,294 B2
(45) Date of Patent: Sep. 20, 2022

(54) METHOD AND SYSTEM TO PREVENT FALSE RESTORATION AND PROTECTION IN OPTICAL NETWORKS WITH A SLICEABLE LIGHT SOURCE

(71) Applicant: Infinera Corp., Annapolis Junction, MD (US)

(72) Inventors: Amit Satbhaiya, Kunadalahalli (IN); Nikhil Kumar Satyarthi, Bangalore (IN); Sanjeev Ramachandran, Manipal (IN); Rajan Rao, Fremont, CA (US); Baranidhar Ramanathan, Karnataka (IN)

(73) Assignee: Infinera Corporation, San Jose, CA (US)

( * ) Notice: Subject to any disclaimer, the term of this patent is extended or adjusted under 35 U.S.C. 154(b) by 0 days.

(21) Appl. No.: 16/152,051

(22) Filed: Oct. 4, 2018

(65) Prior Publication Data

US 2020/0112365 A1    Apr. 9, 2020

(51) Int. Cl.
*H04B 10/079* (2013.01)
*H04B 10/66* (2013.01)

(52) U.S. Cl.
CPC ... *H04B 10/0791* (2013.01); *H04B 10/07955* (2013.01); *H04B 10/66* (2013.01)

(58) Field of Classification Search
CPC ..... H04B 10/03; H04B 10/27; H04J 14/0212; H04J 14/0221; H04J 14/0227; H04J 14/0228; H04J 14/0268; H04J 2203/006; H04Q 11/0066; H04Q 2011/0081
USPC .......................................................... 398/10
See application file for complete search history.

(56) References Cited

U.S. PATENT DOCUMENTS

| | | | | |
|---|---|---|---|---|
| 9,831,942 | B2* | 11/2017 | Rao | H04J 14/0291 |
| 10,602,246 | B2* | 3/2020 | Rao | H04J 14/0293 |
| 2013/0251365 | A1* | 9/2013 | Sone | H04J 14/0201 398/38 |
| 2015/0381276 | A1* | 12/2015 | Saito | H04B 10/0799 398/34 |
| 2016/0204875 | A1* | 7/2016 | Araki | H04J 14/02 398/34 |
| 2016/0204876 | A1* | 7/2016 | Kamura | H04J 14/0227 398/79 |
| 2016/0261362 | A1* | 9/2016 | Ojima | H04B 10/572 |

(Continued)

OTHER PUBLICATIONS

Ujjwal et al; Distance adaptive hybrid super-channels enabled by sliceable bandwidth variable transponder for spectrally efficient elastic optical networks; Oct. 2021, Science direct, pp. 1-16. (Year: 2021).*

*Primary Examiner* — Amritbir K Sandhu
(74) *Attorney, Agent, or Firm* — David L. Soltz

(57) ABSTRACT

A transport network, a node, and a method are disclosed. The transport network, the node, and the method detect a failure of a super channel originating from a sliceable light source that is routed through the transport network, by detecting an optical loss of signal by an optical power monitoring device, in presence or absence of an optical loss of signal of the complete band by at least one photo detector. This information is analyzed with a fault detection algorithm using a patch cable network configuration to determine a fault indication for a failure within the first node. The fault signal indicative of the fault indication is then passed to another node on the first path.

8 Claims, 12 Drawing Sheets

(56) References Cited

U.S. PATENT DOCUMENTS

| | | | |
|---|---|---|---|
| 2017/0338887 A1* | 11/2017 | Rao | H04B 10/07955 |
| 2017/0353264 A1* | 12/2017 | Rao | H04J 14/0275 |
| 2019/0007131 A1* | 1/2019 | Satyarthi | H04J 14/0228 |
| 2020/0059712 A1* | 2/2020 | Satyarthi | H04J 14/0221 |

* cited by examiner

METHOD AND SYSTEM TO PREVENT FALSE RESTORATION AND PROTECTION IN OPTICAL NETWORKS WITH A SLICEABLE LIGHT SOURCE

FIELD OF THE DISCLOSURE

The disclosure generally relates to methods and apparatuses for preventing false restoration or protection in optical networks using a controller at an add node that generates and sends at least one fault indication for a failure of super-channel originating from a sliceable light source using an optical loss of signal detected by at least one optical power monitoring device, in combination or absence of an optical loss of signal detected by a photo-detector and co-relating the same with a local patch cable network configuration.

BACKGROUND

An Optical Transport Network (OTN) is comprised of a plurality of switch nodes linked together to form a network. The OTN includes a data layer, a digital layer, and an optical layer. The optical layer contains multiple sub-layers. OTN structure, architecture, and modeling are further described in the International Telecommunication Union recommendations, including ITU-T G.709, ITU-T G.872, and ITU-T G.805, which are well known in the art. In general, the OTN is a combination of the benefits of SONET/SDH technology and dense wavelength-division multiplexing (DWDM) technology (optics).

The construction and operation of switch nodes (also referred to as "nodes") in the OTN is well known in the art. In general, the nodes of an OTN are generally provided with a control module, input interface(s) and output interface(s). The control modules of the nodes in the OTN function together to aid in the control and management of the OTN. The control modules can run a variety of protocols for conducting the control and management (i.e. Operation, Administration and Maintenance—referred to as OAM) of the OTN. One prominent protocol is referred to in the art as Generalized Multiprotocol Label Switching (GMPLS).

Generalized Multiprotocol Label Switching (GMPLS) is a type of protocol which extends multiprotocol label switching (MPLS) to encompass network schemes based upon time-division multiplexing (e.g. SONET/SDH, PDH, G.709), wavelength multiplexing, and spatial switching (e.g. incoming port or fiber to outgoing port or fiber). Multiplexing is when two or more signals or bit streams are transferred over a common channel.

Wave-division multiplexing is a type of multiplexing in which two or more optical carrier signals are multiplexed onto a single optical fiber by using different wavelengths (that is, colors) of laser light.

Generalized Multiprotocol Label Switching (GMPLS) includes multiple types of label switched paths including protection and recovery mechanisms which specify (1) working connections within a network having multiple nodes and communication links for transmitting data between a headend node and a tailend node; and (2) protecting connections specifying a different group of nodes and/or communication links for transmitting data between the headend node to the tailend node in the event that one or more of the working connections fail. Working connections may also be referred to as working paths. Protecting connections may also be referred to as recovery paths and/or protecting paths and/or protection paths. A first node of a path may be referred to as a headend node or a source node.

A last node of a path may be referred to as a tailend node, end node or destination node. The headend node or tailend node initially selects to receive data over the working connection and, if a working connection fails, the headend node or tailend node may select a protecting connection for passing data within the network. The set up and activation of the protecting connections may be referred to as restoration or protection.

Lightpaths are optical connections carried over a wavelength, end to end, from a source node to a destination node in an optical transport network (OTN). Typically, the lightpaths pass through intermediate links and intermediate nodes in the OTN. At the intermediate nodes, the lightpaths may be routed and switched from one intermediate link to another intermediate link. In some cases, lightpaths may be converted from one wavelength to another wavelength at the intermediate nodes.

As previously mentioned, optical transport networks (OTN) have multiple layers including a data packet layer, a digital layer, and an optical layer (also referred to as a photonic layer). The data and digital layers include an optical channel transport unit (OTU) sub-layer and an optical channel data unit (ODU) sub-layer. The optical layer has multiple sub-layers, including the Optical Channel (OCh) layer, the Optical Multiplex Section (OMS) layer, and the Optical Transmission Section (OTS) layer. The optical layer provides optical connections, also referred to as optical channels or lightpaths, to other layers, such as the electronic layer. The optical layer performs multiple functions, such as monitoring network performance, multiplexing wavelengths, and switching and routing wavelengths. The Optical Channel (OCh) layer manages end-to-end routing of the lightpaths through the optical transport network (OTN). The Optical Multiplex Section (OMS) layer network provides the transport of optical channels through an optical multiplex section trail between access points. The Optical Transmission Section (OTS) layer network provides for the transport of an optical multiplex section through an optical transmission section trail between access points. The OCh layer, the OMS layer, and the OTS layer have overhead which may be used for management purposes. The overhead may be transported in an Optical Supervisory Channel (OSC).

The Optical Supervisory Channel (OSC) is an additional wavelength that is adapted to carry information about the network and may be used for management functions. The OSC is carried on a different wavelength than wavelengths carrying actual data traffic. Typically, the OSC is used hop-by-hop and is terminated and restarted at every node.

The International Telecommunications Union (ITU) recommendation ITU-T G.709 further defines the OTS, OMS and OCh layers and recommends use of the OSC to carry overhead corresponding to the layers. Additionally, ITU-T recommendation G.872 specifies defects for the OTS, OMS, and OCh layers as well as specifying Operation, Administration & Maintenance (OAM) requirements.

ITU-T recommendations suggest that the OSC utilize a Synchronous Transport Signal (STS) Optical Carrier transmission rate OC-3. Optical Carrier transmission rates are a standardized set of specifications of transmission bandwidth for digital signals that can be carried on fiber optic networks. The OC-3 frame contains three column-interleaved STS Level 1 (STS-1) frames; therefore, the line overhead consists of an array of six rows by nine columns (that is, bytes). The OC-3 frame format is further defined in Telecordia's Generic Requirements GR-253, "Synchronous Optical Network Common Generic Criteria," Issue 4. The OC-3 frame format contains a transport overhead portion. Within the transport overhead portion, bytes designated as D4, D5, D6, D7, D8, D9, D10, D11, and D12 are defined by GR-253 for use by Data Communication Channel (DCC).

The patent application identified by U.S. Ser. No. 13/452,413, titled "OPTICAL LAYER STATUS EXCHANGE OVER OSC-OAM METHOD FOR ROADM NETWORKS" filed on Apr. 20, 2012, discloses methods for supporting OAM functions for the optical layers, for example, for carrying defect information and overhead in the OSC. The application discloses methodology and apparatuses for supporting OAM functions such as continuity, connectivity, and signal quality supervision for optical layers. The methodology discloses mapping optical layer overhead OAM information to specific overhead bits and assigning the overhead bits to specific OSC overhead bytes. This provides reliable exchange of overhead bytes over OSC between nodes.

There are many forms of failure indications, such as Open Connection Indication (OCI), Forward Defect Indication (FDI or FDI-P) and Lock (LCK). The network element determines which type of fault indication to transmit downstream. This can be accomplished by an optical supervisory channel controller.

In a first level of fault processing, network elements conduct a local determination of optical signal integrity with inputs from various patch cabling points. This is accomplished with a local photodetector or an optical power measuring device. The local determination results in another form of signal known in the art as Optical Loss of Signal (OLOS) clear/declare. The results of the first level of processing (optical power monitor scanner) and its deduced fault indications (Port OLOS or SCH OLOS), are correlated and consolidated in a second level of fault processing. Based on the consolidation, a final deduced signaling indication is determined and sent downstream through the Optical Supervisory Channel. The second level of processing is generally required to distinguish whether there is a failure at the source (ROUTING card input) meaning that the optical path cannot be restored. In cases of failure at the source, a special Client Signal Failure (CSF) indication may also be sent downstream in the Optical Supervisory Channel. This is required because unlike certain types of fault indications, such as FDI/OCI/LCK, a fault indication indicating a Client Signal Failure means that the traffic cannot be restored. Thus, receipt of a Client Signal Failure indication by a downstream network element does not result in a restoration or protection trigger. Client Signal Failure indications help in decision making taken by the restoration or protection mechanism by isolating restorable failure cases from non-restorable failure cases (described in depth in detail in the following sections). In case of failure conditions which manifest in Client Signal Failure, the failure is at the source itself and there is no alternate path available to restore the traffic. Hence, the restoration or protection mechanism will decide not to switch to an alternate path in such cases.

Some network elements include a sliceable light source meaning that the light source can source multiple super channels. Each super channel is formed of multiple distinct frequency bands that are then routed together. For the sliceable light sources, in the event that only one of the super channels has failed and is not sourcing enough power, such failure cannot be detected by the local photodiode as a complete loss of optical signal at band level is not there and only one of the super-channels has a failure but may be detected by a local optical power monitoring device. Further, the type of downstream signaling (FDI or CSF) is determined by an optical supervisory channel controller. In certain cases, restorable failure scenarios (discussed in depth in a later section) result in downstream FDI signaling which causes the restoration and protection engines of downstream nodes to begin restoration procedures. For non-restorable failure scenarios, CSF is signaled which will prevent the restoration and protection engines of the downstream nodes to take any action.

In light of the foregoing, there is a need to prevent false restoration in optical transport networks by detecting a failure at the source when using a sliceable light source. It is to such a system that detects failures at the source when using a sliceable light source that the present disclosure is directed.

SUMMARY

Methods and optical nodes are disclosed. The problems caused by false restoration after a failure at the source has occurred with a sliceable light source is fixed by detecting an optical loss of signal by an optical power monitoring device within a multiplexer of an add node in presence or absence of an optical loss of signal detected by a photo-detector at an input port of the multiplexer, and co-relating the same using a patch cable network configuration within the add node to detect a failure at the source (when appropriate) and generate an FDI and/or an client signal failure signal (CSF). The client signal failure signal can be provided downstream in an optical supervisory channel to prevent false restoration due to a failure at the source.

BRIEF DESCRIPTION OF THE DRAWINGS

The accompanying drawings, which are incorporated in and constitute a part of this specification, illustrate one or more implementations described herein and, together with the description, explain these implementations. In the drawings.

DETAILED DESCRIPTION

Figure 1:
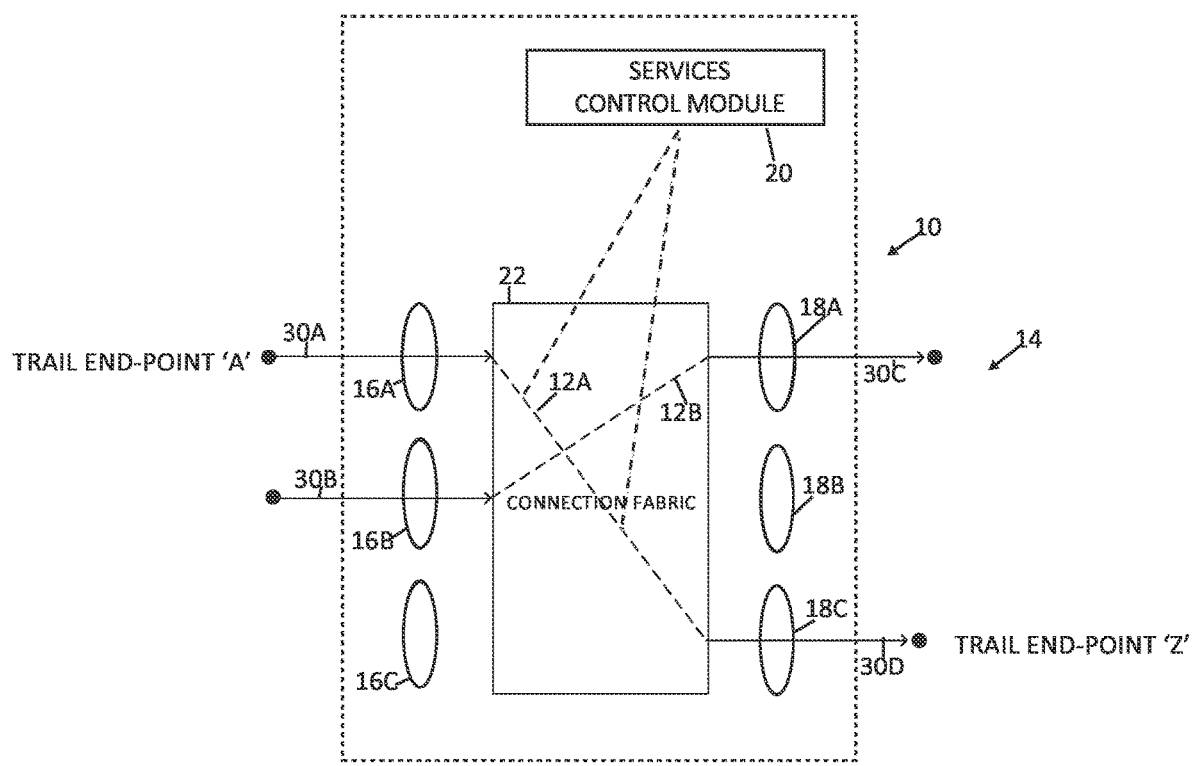
FIG. 1 is a partial illustration of an exemplary node within an optical transport network in accordance with the present disclosure describing concepts within the optical transport network including services, fiber ports/interfaces, an optical switch, and physical connections within the optical switch directing data traffic from trail end point A to trail end point Z.

The following detailed description refers to the accompanying drawings. The same reference numbers in different drawings may identify the same or similar elements.

The problems caused by false restoration after a failure at the source has occurred for a super-channel originating from a sliceable light source is fixed by detecting an optical loss of signal by an optical power monitoring device within a multiplexer of an add node with presence or absence of an optical loss of signal being detected by a photo-detector at an input port of the multiplexer, and using a patch cable network configuration within an add node to detect a failure at the source (when appropriate) and generate an FDI and/or an client signal failure signal (CSF). The client signal failure signal can be provided downstream in an optical supervisory channel to prevent false restoration when a super channel originating from the sliceable light source has failed.

Definitions

If used throughout the description and the drawings, the following short terms have the following meanings unless otherwise stated:

Band: The complete optical spectrum carried on the optical fiber. Depending on the fiber used and the supported spectrum which can be carried over long distances with the current technology, relevant examples of the same are: C-Band/L-Band/Extended-C-Band.

Slice: In an N GHz (N=12.5, 6.25, 3.125) spaced frequency band of the whole of the optical spectrum each such constituent band is called a slice. In one embodiment, a slice is the resolution at which the power levels can be measured by the optical monitoring device. The power level being measured by the optical monitoring device represents the total optical power carried by the band represented by that slice. A super-channel pass-band is composed of a set of contiguous slices.

CSF: (Client Signal Fail)—is a signal sourced by the add node at the head-end to signal the downstream nodes in an optical network that there is a failure at the source. It is used to prevent false protection and restoration.

FDI—Forward Defect Indication; and FDI-P (Forward Defect Indication Path) are signals sent downstream as an indication that an upstream defect has been detected. This is similar to AIS (Alarm Indication Signal) used in SONET/SDH.

OCI—Open Connection Indication is a signal to indicate that a particular OTN interface is not connected to an upstream signal.

LCK—Lock. It's a signal transmitted to the downstream to indicate that the traffic has been brought down intentionally by the user through some external command for some maintenance activity in the network.

LS (Light source): A card where the digital transport client is mapped/de-mapped to/from an optical channel. This is the place where the optical channel originates/terminates. In the present disclosure, the LS may be a sliceable light source configured to source multiple slices of light simultaneously.

OAM (Operations Administration Maintenance): A standardized terminology in transport networks used to monitor and manage the network.

OA (Optical Amplifier): A band control gain element generally EDFA or RAMAN based.

ODU—Optical Data Unit

OLDP (Optical Layer Defect Propagation): A fault propagation mechanism in the optical layer for OAM considerations and to facilitate protection or restoration using the overhead frames mapped to an OSC.

OLOS—Optical Loss of Signal

OPM (Optical Power Monitor device): A device having a capability to monitor power on a particular part of the spectrum on a per slice basis.

OSC (Optical Supervisory Channel): This is an additional wavelength usually outside the amplification band (at 1510 nm, 1620 nm, 1310 nm or another proprietary wavelength). The OSC carries information about the multi-wavelength optical signal as well as remote conditions at the optical add/drop or OA sites. It is used for OAM in DWDM networks. It is the multi-wavelength analogue to SON ET's DCC (or supervisory channel).

NMS—Network Management System

PD (Photodetector): A device which can measure the power levels in the complete band.

Power Control: The algorithm run in the power control domain to measure the optical parameters and do the power adjustments to meet the target power level.

ROADM: Reconfigurable optical add drop multiplexer.

SCH (Super Channel/Optical Channel): A group of wavelengths sufficiently spaced so as not to cause any interference among themselves which are sourced from a single light source including multiple lasers, each of which supplying light at a corresponding wavelength, and managed as a single grouped entity for routing and signaling in an optical network.

Sliceable Light Source: A light source originating multiple super-channels/optical channels.

WSS (Wavelength Selective Switch): A component used in optical communications networks to route (switch) optical signals between optical fibers on a per-slice basis. Generally power level controls can also be done by the WSS by specifying an attenuation level on a pass-band. The wavelength selective switch is a programmable device where the source and destination fiber ports and associated attenuation can be specified for a pass-band.

DESCRIPTION

As used herein, the terms "comprises," "comprising," "includes," "including," "has," "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus. Further, unless expressly stated to the contrary, "or" refers to an inclusive or and not to an exclusive or. For example, a condition A or B is satisfied by anyone of the following: A is true (or present) and B is false (or not present), A is false (or not present) and B is true (or present), and both A and B are true (or present).

In addition, use of the "a" or "an" are employed to describe elements and components of the embodiments herein. This is done merely for convenience and to give a general sense of the inventive concept. This description should be read to include one or more and the singular also includes the plural unless it is obvious that it is meant otherwise.

Throughout this application, the term "about" is used to indicate that a value includes the inherent variation of error for the quantifying device, the method being employed to determine the value, or the variation that exists among the study subjects. For example, but not by way of limitation, when the term "about" is utilized, the designated value may vary by plus or minus twelve percent, or eleven percent, or ten percent, or nine percent, or eight percent, or seven percent, or six percent, or five percent, or four percent, or three percent, or two percent, or one percent.

The use of the term "at least one" or "one or more" will be understood to include one as well as any quantity more than one, including but not limited to, 1, 2, 3, 4, 5, 10, 15, 20, 30, 40, 50, 100, etc. The term "at least one" or "one or more" may extend up to 100 or 1000 or more depending on the term to which it is attached. In addition, the quantities of 100/1000 are not to be considered limiting, as lower or higher limits may also produce satisfactory results.

In addition, the use of the phrase "at least one of X, V, and Z" will be understood to include X alone, V alone, and Z alone, as well as any combination of X, V, and Z.

The use of ordinal number terminology (i.e., "first", "second", "third", "fourth", etc.) is solely for the purpose of differentiating between two or more items and, unless explicitly stated otherwise, is not meant to imply any sequence or order or importance to one item over another or any order of addition.

As used herein, any reference to "one embodiment," "an embodiment," "some embodiments," "one example," "for example," or "an example" means that a particular element, feature, structure, or characteristic described in connection with the embodiment is included in at least one embodiment. The appearance of the phrase "in some embodiments" or "one example" in various places in the specification is not necessarily all referring to the same embodiment, for example.

In accordance with the present disclosure, messages, e.g., fault indications, transmitted between nodes can be processed by circuitry within the input interface(s), and/or the output interface(s) and/or a node controller, such as an optical supervisory channel controller discussed below. Circuitry could be analog and/or digital, components, or one or more suitably programmed microprocessors and associated hardware and software, or hardwired logic. Also, certain portions of the implementations have been described as "components" that perform one or more functions. The term "component," may include hardware, such as a processor, an application specific integrated circuit (ASIC), or a field programmable gate array (FPGA), or a combination of hardware and software. Software includes one or more computer executable instructions that when executed by one or more component cause the component to perform a specified function. It should be understood that the algorithms described herein are stored on one or more non-transitory memory. Exemplary non-transitory memory includes random access memory, read only memory, flash memory or the like. Such non-transitory memory can be electrically based or optically based. Further, the messages described herein may be generated by the components and result in various physical transformations. Additionally, it should be understood that the node can be implemented in a variety of manners as is well known in the art.

Referring now to the drawings, and in particular to FIG. 1, shown therein is a partial schematic diagram of a node 10 constructed in accordance with the present disclosure providing services 12A and 12B in a transport network 14. To assist in providing the service 12A, the node 10 is configured to transport data from trailend point 'A' to trailend point T. The transport network may conform to the requirements set forth as per the definitions of ITU-T G.705 for transport network architectural components.

As will be discussed in more detail below, the node 10 is adapted to facilitate the communication of data (which may be referred to herein as "traffic") between multiple nodes 10 in the transport network 14. The node 10 is provided with one or more input interfaces 16 (three input interfaces 16A, 16B, and 16C being depicted in FIG. 1 by way of example), one or more output interfaces 18 (three output interfaces 18A, 18B, and 18C being depicted in FIG. 1 by way of example), a control module 20, and an optical switch 22. The input interfaces 16 are also referred to herein as a tributary input port, or ingress port. The output interfaces 18 are also referred to herein as tributary output port or egress port.

In general, the input interfaces 16A, 16B, and 16C are adapted to receive traffic from the transport network 14, and the output interfaces 18A, 18B, and 18C are adapted to transmit traffic onto the transport network 14. The optical switch 22 serves to communicate the traffic from the input interface(s) 16A, 16B, and 16C, to the output interface(s) 18A, 18B, and 18C to provide the services 12A and 12B, for example. And, the control module 20 serves to control the operations of the input interfaces 16A, 16B, and 16C, the output interfaces 18A, 18B, and 18C, and the switch 22.

The control module 20 may run GMPLS and can be referred to herein as a "control plane." The control plane may use GMPLS protocols to setup one or more working paths and one or more protecting paths during a negotiation. During the negotiation between the control planes of the nodes 10 within the transport network 14, labels may be allocated for in-band signaling as part of the GMPLS processing, for example, as will be appreciated by persons of ordinary skill in the art having the benefit of the instant disclosure.

The node 10 can be implemented in a variety of manners, including commercial installations having one or more backplanes (not shown), racks, and the like. In this example, the input interfaces 16, the output interfaces 18, the control module 20 and the switch 22 are typically implemented as separate devices, which may have their own power supply, local memory and processing equipment. In another example, the node 10 can be implemented as a single device having a shared power supply, memory and processing equipment. Or, in another example, the node 10 can be implemented in a modular manner in which the input interfaces 16, the output interfaces 18, the control module 20 and the switch 22 share a power supply and/or housing.

The input interfaces 16, and the output interfaces 18 of one node 10 are adapted to communicate with corresponding input interfaces 16, and output interfaces 18 of another node 10 within the transport network 14 via communication links 30A, 30B, 30C, and 30D (as shown in FIG. 1). The communication links 30A, 30B, 30C, and 30D may be fiber optic cables. An example of the input interface 16 and/or the output interface 18 is an Ethernet card or optical port. In general, each of the input interfaces 16 and/or the output interfaces 18 may have a unique logical identification, such as an IP address. The implementation of the input interfaces 16, and the output interfaces 18 will depend upon the particular type of communication link 30A, 30B, 30C, and 30D that the particular input interface 16 and/or output interface 18 is designed to communicate with.

In accordance with the present disclosure, messages transmitted between the nodes 10, can be processed by circuitry within the input interface(s) 16, and/or the output interface(s) 18 and/or the control module 20. Circuitry could be analog and/or digital, components, or one or more suitably programmed microprocessors and associated hardware and software, or hardwired logic. Also, certain portions of the implementations have been described as "components" that perform one or more functions. The term "component," may include hardware, such as a processor, an application specific integrated circuit (ASIC), or a field programmable gate array (FPGA), or a combination of hardware and software. Software includes one or more computer executable instructions that when executed by one or more component cause the component to perform a specified function. It should be understood that the algorithms described herein are stored on one or more non-transient or non-transitory memory. Exemplary non-transitory memory includes random access memory, read only memory, flash memory or the like. Such non-transitory memory can be electrically based or optically based. Further, the messages described herein may be generated by the components and result in various physical transformations.

As discussed above, transport network elements, e.g., the node 10, involve service provisioning through a north bound entity—NMS or GMPLS or some other distributed control plane mechanism handling dynamic service provisioning. A service provisioning involves association of two trails as end-points which can be implemented by configuring the optical switch 22 through device settings in the connection fabric. In the transport network 14, the trail entity involved may be a super-channel which is a part of the optical spectrum which carries the digital transport client information converted into light spanning a particular spectrum through some kind of modulation. The optical switch 22 can be implemented as a wavelength selective switch, or in some cases a MCS device.

Figure 2:
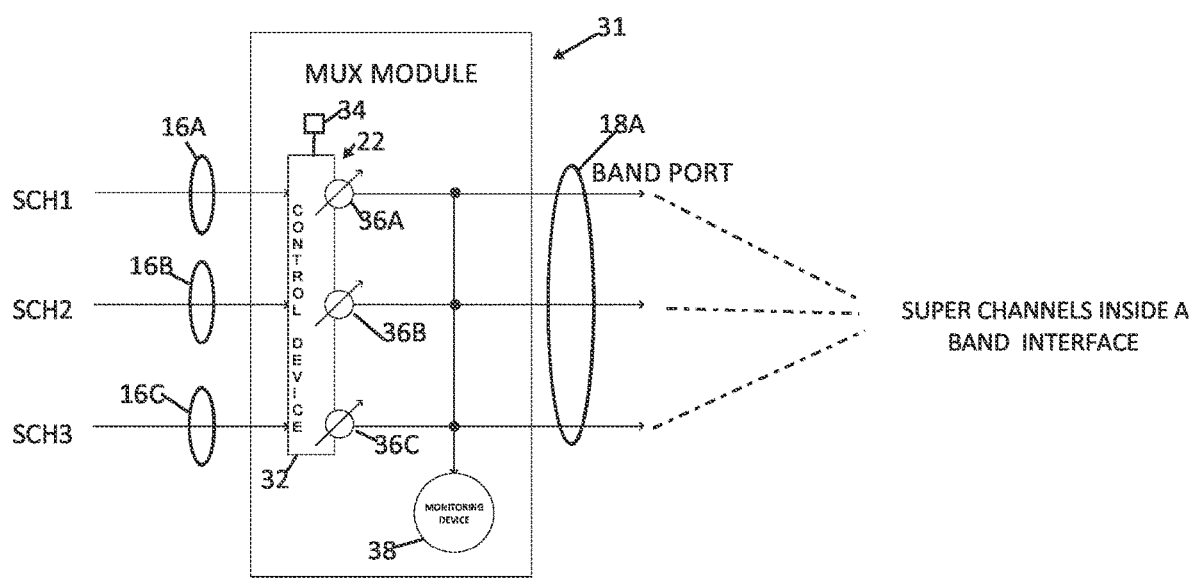
FIG. 2 is another partial illustration of the exemplary node in which the optical switch includes a multiplexer module configured to multiplex a group of super channels to an output port, referred to as a "band port". The multiplexer module of the optical switch includes power control points to configure attenuation to control a launch power of the super channels at the band port.

FIG. 2 depicts an optical device 31, e.g., a card, which is configured to multiplex groups of optical signals (referred to herein as super-channels) provided by the input interfaces 16A, 16B, and 16C to the output interface 18A. The optical device 31 may be implemented as the optical switch 22, which in this example can be a wavelength selective switch 32 having a control device 34 with power control points 36A, 36B, and 36C. The power control points 36A, 36B, and 36C are used to control the light eventually being launched onto the output interface 18 (which is referred to in this example as the "band port." The optical device 31 is also provided with a power monitoring device 38. In general, the control device 34 includes an automatic control loop mechanism to account for losses, equipment aging and change of power at the source.

In modules where the optical switch 22 is the wavelength selective switch 32 used to make associations across the input interfaces 16 and the output interface 18, e.g., the band ports, the same wavelength selective switch 32 provides an option (implemented via the power control points 36A, 36B, and 36C and monitored by the power monitoring device 38) to configure attenuation to control the launch power of the optical signals, e.g., the super-channel. Hence, the fabric and the power control points 36 are parts of the same wavelength selective switch 32. It is still possible in other types of optical switch 22 modules with some other kind of fabric where the fabric is just used to make associations across the input interfaces 16 and the output interfaces 18 but the super-channel power controls is done through some other device, for example—a VOA. The current disclosure does not limit the disclosure to any particular kind of optical switch 22 and is therefore intended to cover all such possible optical switch fabric architectures. To facilitate power controls the power monitoring device 38 can be used.

For the purpose of fault isolation in the transport network 14 and triggers facilitating protection and restoration, defect signaling carried in some in-band or out-band overhead is needed. One of the most important features of any transport network 14, i.e., the OAM, is facilitated through in-band or out-band overhead. In case of the transport network 14, the various fault triggers are OCI, FDI, and CSF, preferably carried in the in-band frame bytes.

As per the definition in OTN specification, OCI is sourced when the connection is absent in the fabric, AIS/FDI in case of upstream failures to indicate to the downstream that some fault has occurred.

In case of the node 10 having the optical switch 22 (such as DWDM equipment with an optical fabric), the various fault triggers are OCI, FDI (similar to AIS), and CSF carried in the OSC.

Figure 3:
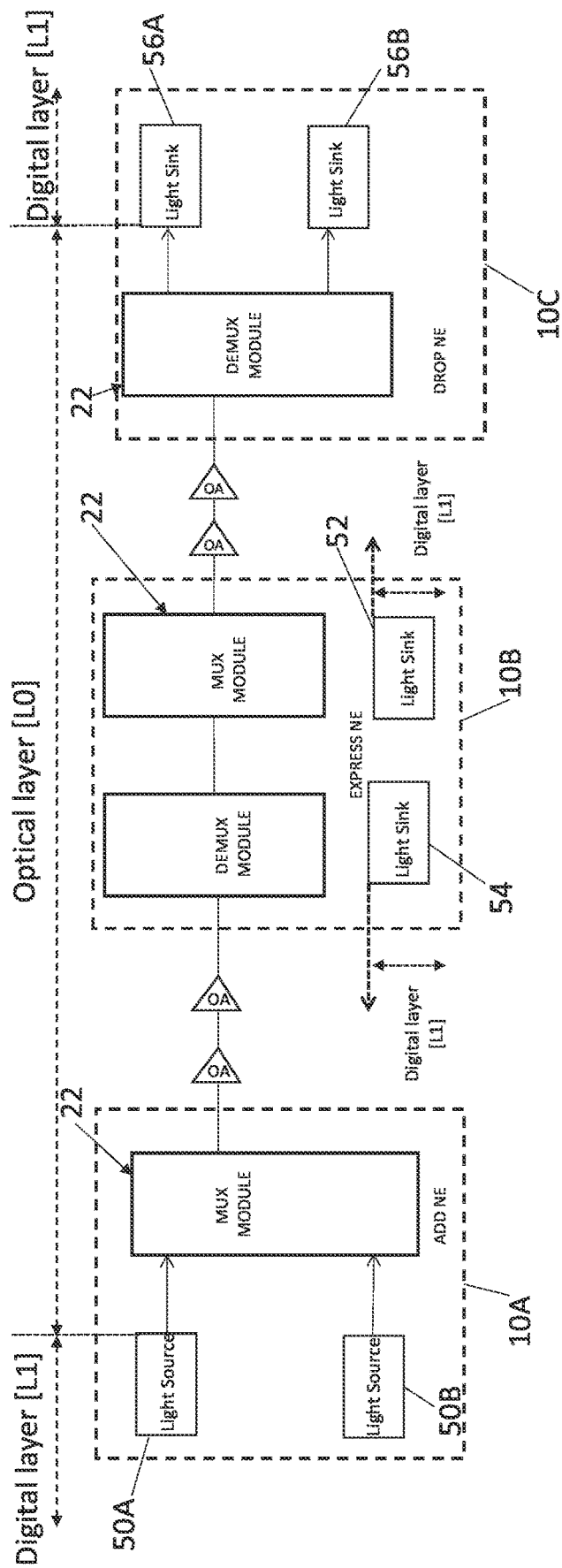
FIG. 3 is a schematic view of an exemplary optical transport network having an add node, an express node, and a drop node in accordance with examples of the present disclosure.

Referring to FIG. 3, shown therein is an example of the transport network 14. In this example, the transport network 14 includes three nodes 10 that are labeled in FIG. 3 with the notations 10A, 10B, and 10C for purposes of clarity. Node 10A is an add node having multiple light sources 50A and 50B, and the optical switch 22 is configured as a multiplexer. Node 10B is an express node having the optical switch 22 implemented as a demultiplexer/multiplexer pair; a light source 52; and a light sink 54. Node 10C is a drop node having the optical switch 22 implemented as a demultiplexer; and multiple light sinks 56A and 56B. The multiplexer/demultiplexer can comprise of colorless wavelength selective switches as a muxing/demuxing device or colored passive muxes/demuxes or may simply involve a junction point to which multiple light sources/sink are connected. The nodes 10A and 10B may also include a routing card 60 (see FIG. 10) which may be directly connected to the light source(s) 50A and/or 50B, and the light sink(s) 56A and/or 56B. The routing card 60 facilitates switching and bridging of the light source(s) 50/light sink(s) 56 to different degrees which may be used for purpose of restoration. The routing card 60 may include an MCS device or simply may be a broadcast module.

Figure 4:
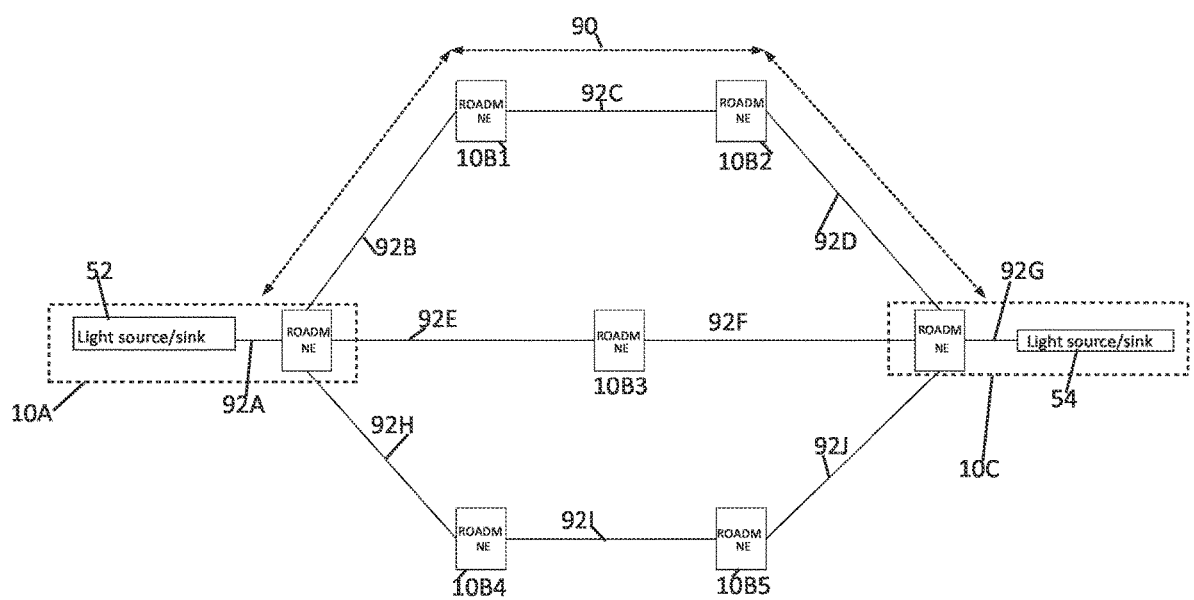
FIG. 4 is a flow diagram of an exemplary optical transport network having an add node, multiple express nodes, and a drop node where data traffic is provided via a path from the add node, through the express nodes to the drop node in accordance with the present disclosure.

Shown in FIG. 4 is another example of the transport network 14, having nodes 10 labeled for purposes of clarity as 10A, 10B1, 10B2, 10B3, 10B4, 10B5, and 10C. In this example, the node 10A is the add node; the nodes 10B1, 10B2, 10B3, 10B4, 10B5 are express nodes, and node 10C is a drop node. Also shown in FIG. 4 is a lightpath 90 providing a service from the add node 10A to the drop node 10C. As discussed herein, a lightpath is a connection between two nodes 10 in the transport network 14, and is set up by assigning a dedicated wavelength on each link in the lightpath. In this case, the lightpath 90 provides an optical service from the light source 52 of the node 10A to the light sink 54 of the node 10C, and vice-versa. The optical layer multiplexes multiple lightpaths into a single fiber and allows individual lightpaths to be extracted efficiently from the composite multiplex signal at node 10C, for example. This lightpath can be set up or taken down in response to a request. The transport network 14 may include any number of optical nodes 10. Further, the transport network 14 may be configured in any topology, for example, linear, ring, or mesh.

For purposes of simplicity of explanation, communication links 92A-92J are illustrated in FIG. 4, but it will be understood that there may be more or fewer communication links 92.

The optical nodes 10 are adapted to facilitate the communication of data traffic (which may be referred to herein as "traffic" and/or "data") in the transport network 14 over communication links 92A-92J, as well as into and out of the transport network 14.

The communication links 92 can be implemented in a variety of ways, such as an optical fiber or other waveguide carrying capabilities. The communication links 92 can be fiber optic cables. Some of the communication links 92 can be implemented as patch cables, such as the communication links 92A and 92G.

Figure 5:
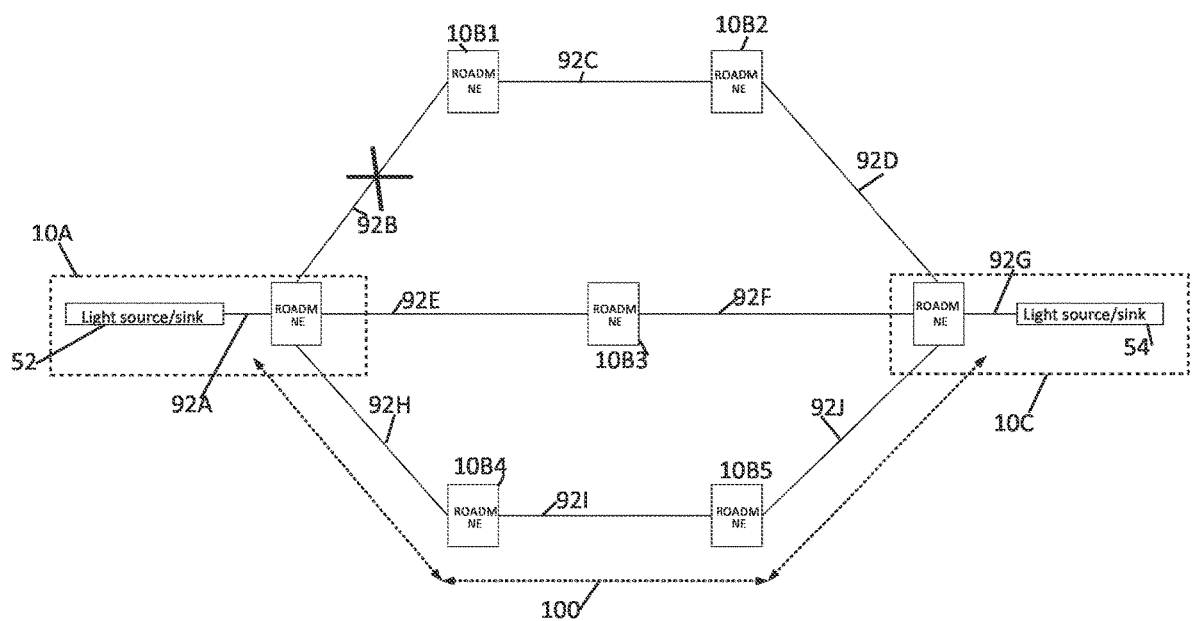
FIG. 5 is a flow diagram of the exemplary optical transport network of FIG. 4 where a fault has occurred between the add node and an express node, and where a restoration/protection path has been created between the add node and the drop node.

FIG. 5 shows a failure occurring in the transport network 14 in the communication link 92B, and an alternate restore/protect path 100 being set up for the optical service when a failure happened on the previous lightpath 90. As shown in FIG. 5, the lightpath 90 has been disabled.

Figure 6:
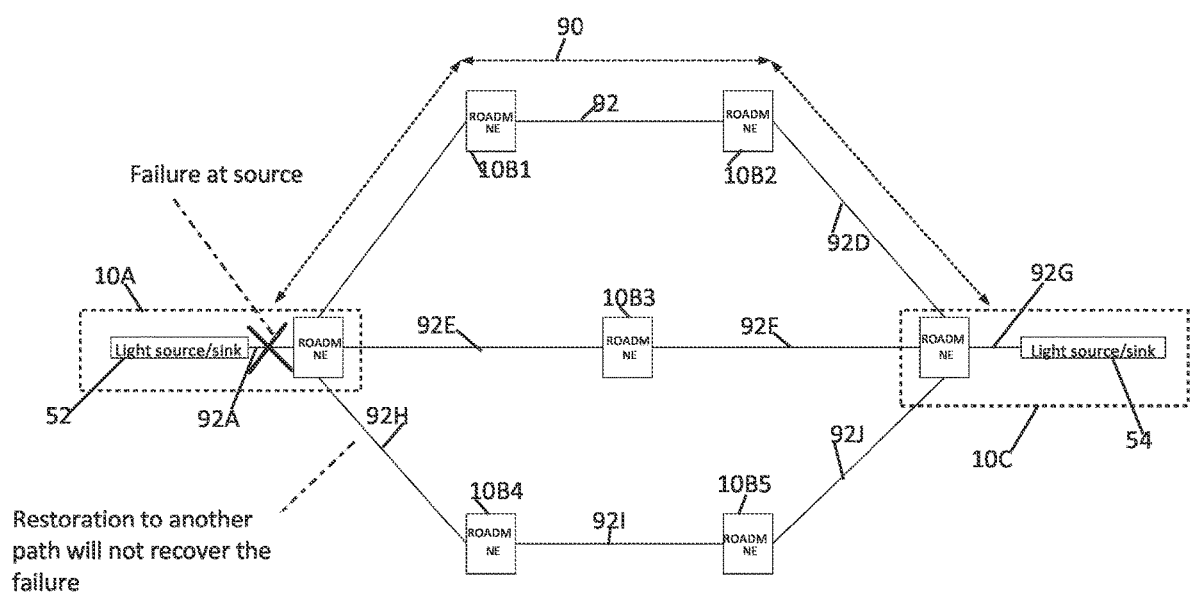
FIG. 6 is a flow diagram of the exemplary optical transport network of FIG. 4 where a fault (known as a failure at the source) has occurred within the add node in a location in which restoration or protection is in-effective since there is no alternate path available for the data traffic.

FIG. 6 shows a failure scenario in the transport network 14 in the communication link 92A where restoration or protection is in-effective since there is no alternate path available for the traffic flow. Such kinds of failure are referred to as failure at the source.

Figure 7:
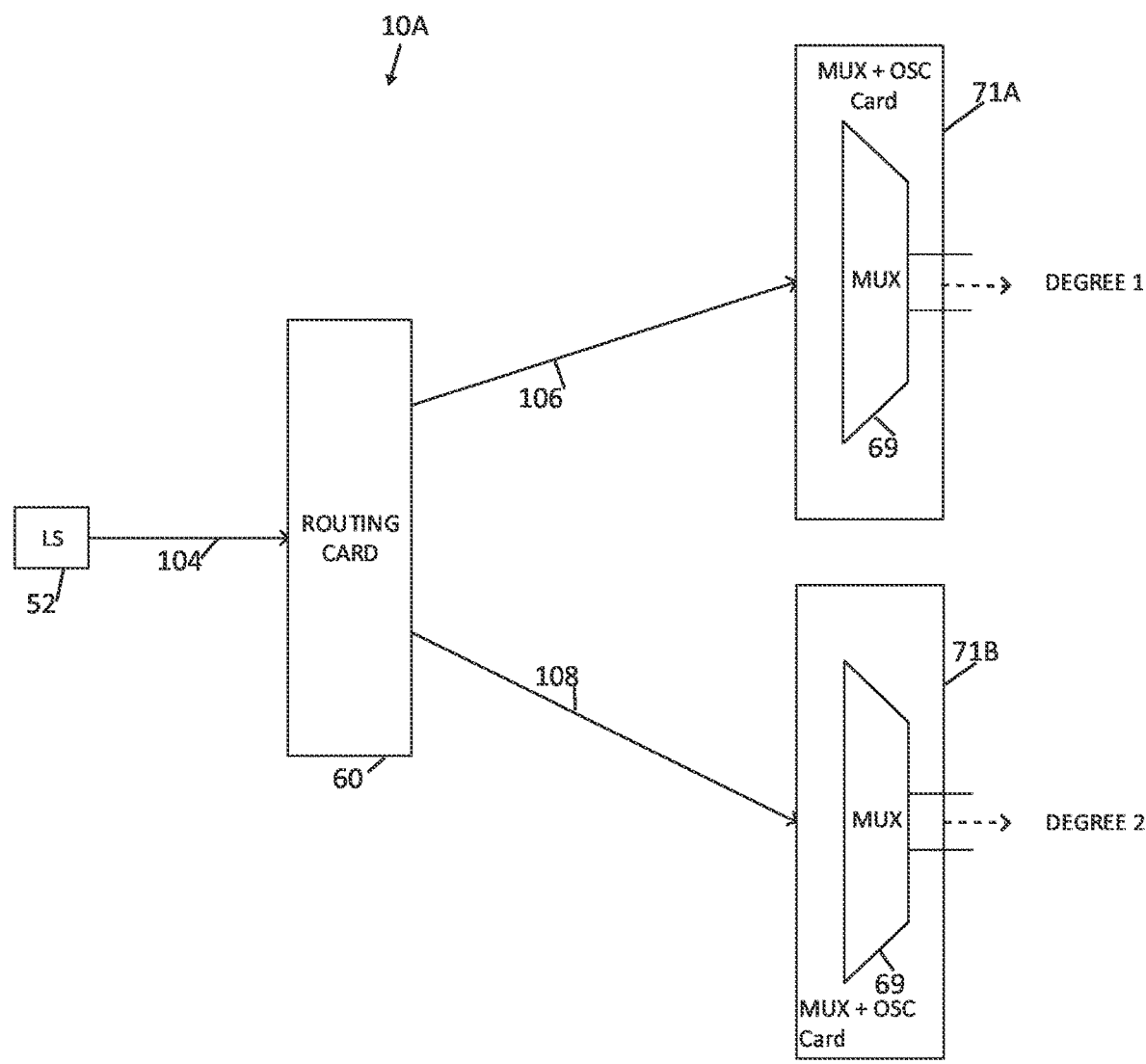
FIG. 7 is a schematic diagram of the exemplary add node depicting a chain of patch cable connections within the add node, and different output ports that are known in the art as "degrees".

FIG. 7 is a block diagram of part of the add node 10A in which the light source 52 is connected to the routing card 60 with a first patch cable 104. The routing card 60 is connected to a first MUX/OSC card 71A via a second patch cable 106, and is also connected to a second MUX/OSC card 71B via a third patch cable 108. The line out towards network for the first MUX/OSC card 71A is referred to in FIG. 7 as DEGREE 1; and the line out towards network for the second MUX/OSC card 71B is referred to in FIG. 7 as DEGREE 2.

Figure 8:
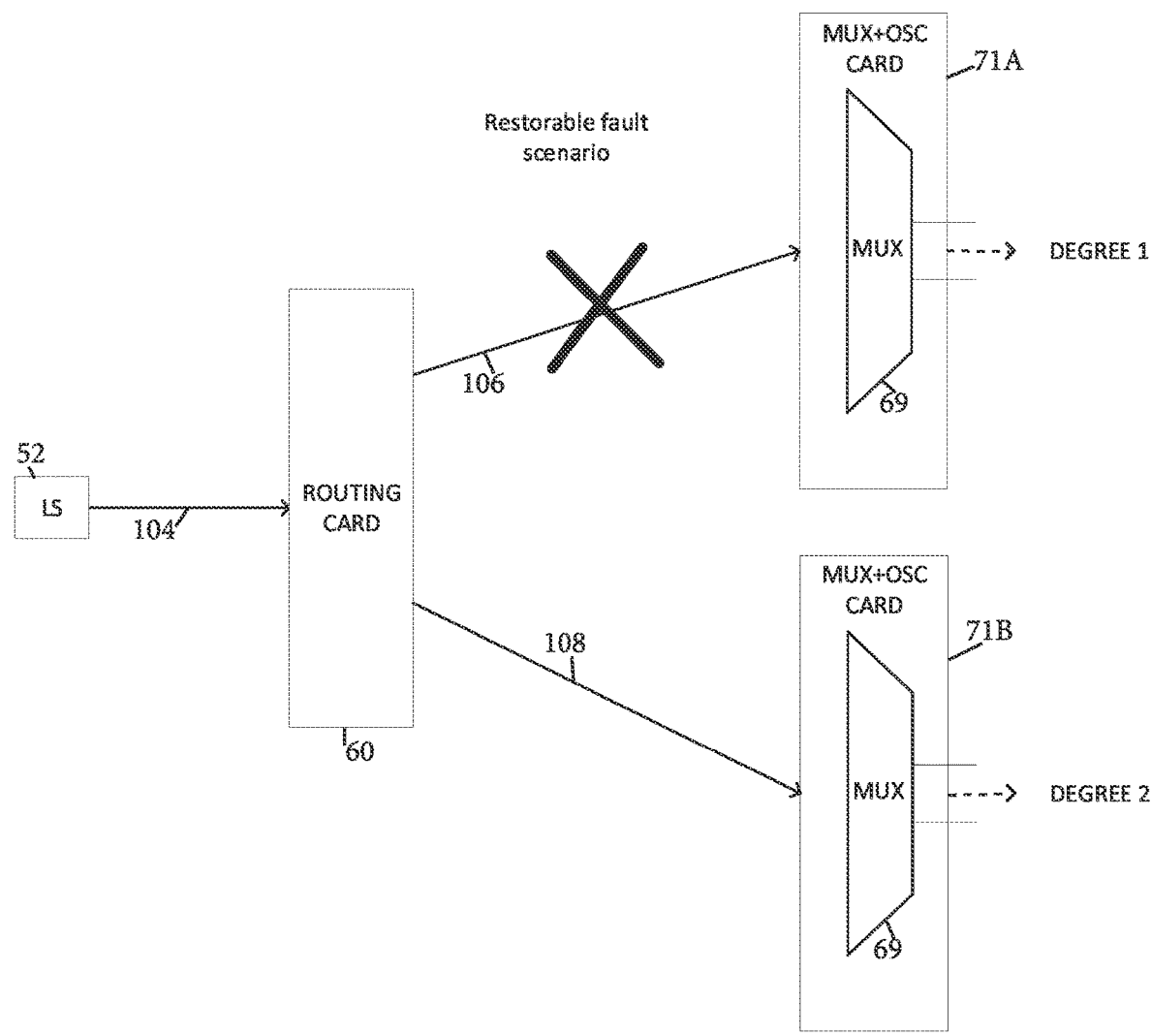
FIG. 8 is another schematic diagram of the add node of FIG. 7 in which a restorable fault has occurred in a patch cable connecting a routing card to one of a group of wavelength selective switches in the add node.

FIG. 8 is another block diagram of the part of the add node 10A depicted in FIG. 7 showing an exemplary patch cable failure in the patch cable 106 which manifests in downstream FDI signaling.

Figure 9:
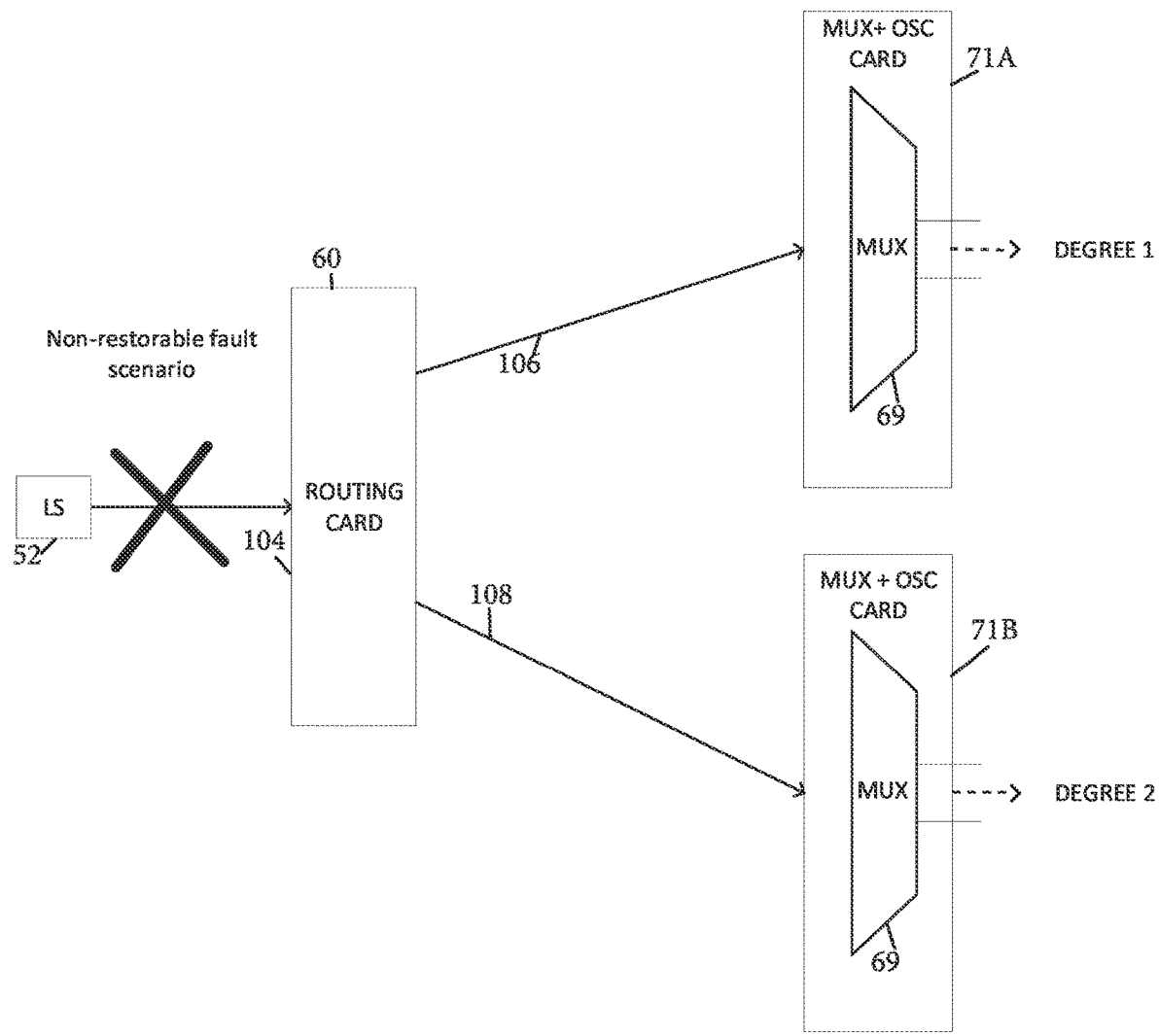
FIG. 9 is another schematic diagram of the add node of FIG. 7 in which a non-restorable fault (known as a failure at the source) has occurred between a light source and a routing card within the add node.
Figure 10:
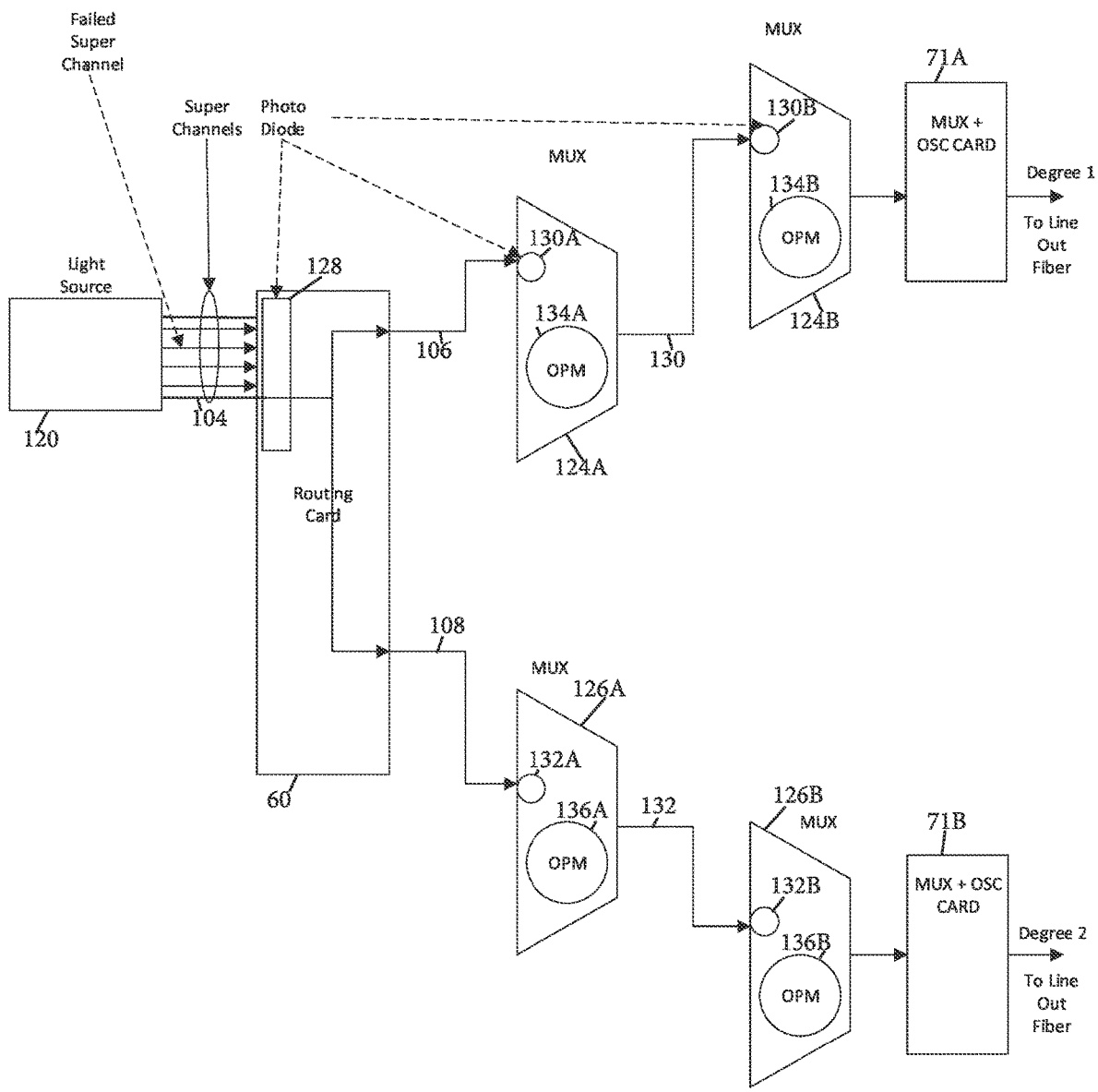
FIG. 10 is a schematic diagram of an exemplary add node having a sliceable light source, and showing a super channel failure on the sliceable light source that is not detected by local photodiodes.

FIG. 9 is another block diagram of the part of the add node 10A depicted in FIG. 10 showing another exemplary patch cable failure scenario in the patch cable 104 which manifests as downstream CSF signaling. This condition is referred to as failure at the source.

FIG. 10 is another block diagram of the add node 10A having a sliceable light source 120 generating multiple super channels and providing the multiple super channels to the routing card 60 via the patch cable 104. In this embodiment, the add node 10A include a first series of cascaded multiplexers 124A-124B, and a second series of cascaded multiplexers 126A-126B. The routing card 60 is connected to an input port of the multiplexer 124A via the second patch cable 106, and is also connected to an input port of the multiplexer 126A via a third patch cable 108. An output port of the multiplexer 124A is connected to an input port of the multiplexer 124B via a fourth patch cable 130. An output port of the multiplexer 126A is connected to an input port of the multiplexer 126B via a fifth path cable 132. The add node 10A can be provided with additional multiplexers and patch cables to multiplex further slices/super channels into the MUX/OSC cards 71A or 71B. In any event, the routing card 60 includes a photodetector 128 placed at the input port of the routing card 60 to determine the presence or absence of the super channels and to output a signal indicative of an optical loss of signal in the absence of the super channels. The multiplexers 124A, 124B, 126A, and 126B also include a photodector 130A, 130B, 132A, 132B that are also placed at the input port to determine the presence or absence of the super channels and to output a signal indicative of an optical loss of signal in the absence of the entire band, including those slices occupied by the super channels. The multiplexers 124A, 124B, 126A, and 126B also include an optical power monitoring device 134A, 134B, 136A, 136B that measure optical power on a per slice basis to determine the presence or absence light on particular slices within the super channels and to output a signal indicative of an optical loss of signal in the absence of light on one or more slices within the super channels.

The sliceable light source 120 originates multiple wavelengths in C/Extended-C/L band, composing multiple super channels, directed toward different destinations using the routing and/or broadcasting multiplexers 124A, 124B, 126A, and 126B, and MUX/OSC cards 71A and 71B.

Figure 12:
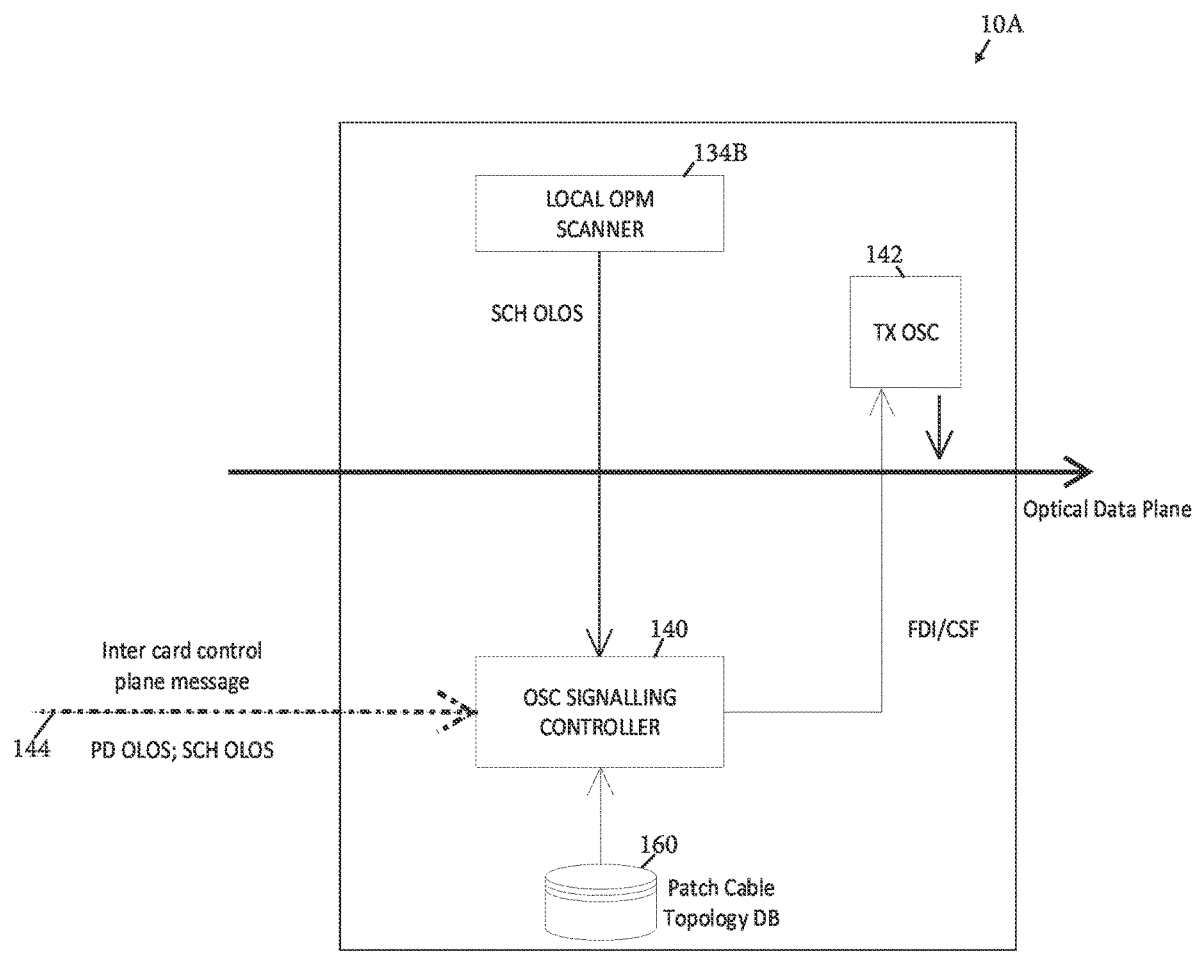
FIG. 12 is a partial block diagram of the add node in which an optical supervisory channel signaling controller is running the fault detection algorithm of FIG. 12 to convert an OLOS indication into a client signal failure declare signal in accordance with the present disclosure.

Each of the optical power monitoring devices 134A, 134B, 136A, and 136B indicates OLOS raise and clear condition for a super channel and sends the OLOS raise and clear condition to the OSC signaling controller 140, that executes the fault detection algorithm and decides on the signaling indication (OCI/FDI/LCK/CSF) to be sent to an OSC signaling transmitter 142 to trigger restoration in the downstream protection and recovery engines. In FIG. 12, the optical power monitoring device 134B, the OSC signaling controller 140, and the OSC signaling transmitter 142 are hosted on the same card. In another implementation, it may be possible to have the optical power monitoring device 134B, the OSC signaling controller 140, and the OSC signaling transmitter 142 hosted in different cards. In such cases, the flow of signaling indication SCH OLOS from the optical power monitoring device 134B, to the OSC signaling controller 140 will be done through an inter-card control plane messaging as designated by a reference numeral 144, and shown in FIG. 12 rather than the currently shown intra-card control plane messaging.

The optical power monitoring device 134B may also send optical control loop messages to be mapped to some part of the digital frame formed by the OSC signaling transmitter 142 to be sent to downstream nodes 10B and 10C for control loop purpose. This is not shown in the current diagram as the same can also be sent through some other interface to the downstream nodes 10B and 10C. The super channels from the sliceable light source 120 are multiplexed and transported in the transport network 14.

The routing card 60 facilitates switching and bridging of the light source/sink to different degrees, used for purpose of restoration. A base device in a routing card may be an MCS device or simply may be a broadcast module.

The multiplexers 124A, 124B, 126A, and 126B may comprise one or more WSS, or may simply involve a junction point to which multiple light sources/sink are connected.

The present disclosure provides a solution to prevent false restoration for any failed super channel, which is sourced from the sliceable light source 120. The sliceable light source 120 is associated with the routing card 60 that can independently route a super channel along different paths. The cascaded multiplexers 124A and 124B, and 126A and 126B, for example, are preferably within the same node 10A as the sliceable light source 120 and the routing card 60.

As discussed above, the photodetectors 128, 130A, 130B, 132A, and 132B, for example, cannot detect failure of a particular super channel sourced from the sliceable light source 120, as the photodetectors 128, 130A, 130B, 132A, and 132B will not detect complete optical loss of light due to multiple super channels being incident on the photodetectors 128, 130A, 130B, 132A, and 132B.

A particular failed slice within the super channel or carrier level OLOS can be detected by the optical power monitoring devices 134A, 134B, 136A, and 136B. This failure for a particular super channel can act as a restoration trigger. By knowing photodetector and optical power monitoring device locations within a patch cable network configuration of the add node 10A, correlating photodetector detected signals (e.g., sufficient light, or optical loss of light) and optical power monitoring device reported failure, such false restorations can be avoided in accordance with the present disclosure.

Figure 11:
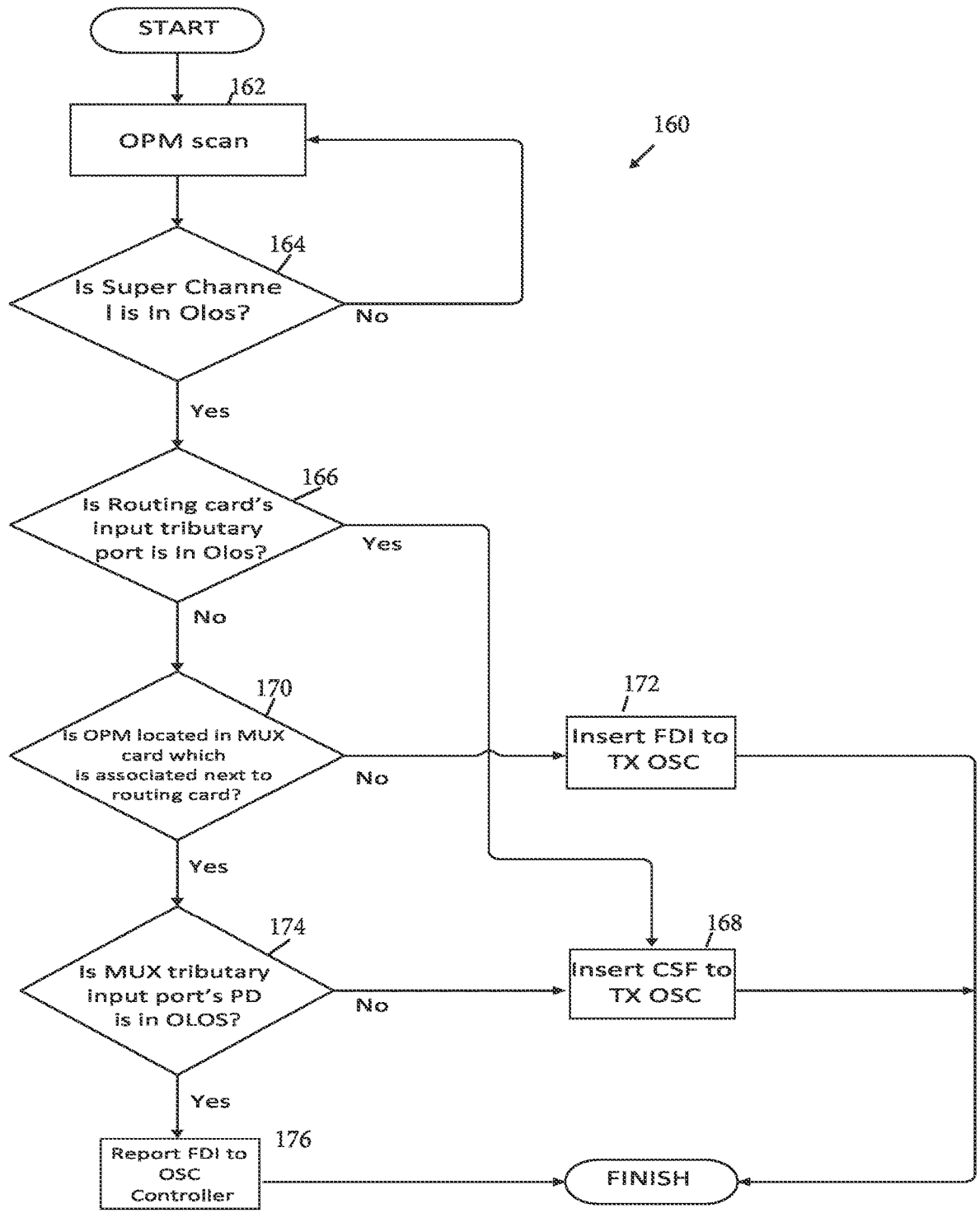
FIG. 11 is a flow chart of a fault detection algorithm that uses different types of optical loss of signals and a local patch cable network configuration to effectively solve the false restoration cases.

FIG. 11 is a flow chart of a fault detection algorithm 160 that can be run by the OSC signaling controller 140 that uses an optical loss of signal detected by at least one of the optical power monitoring devices 134A, 134B, 136A, and 136B, during the absence of an optical loss of signal being detected by the photo-detectors 128, 130A, 130B, 132A, and 132B, and a patch cable network configuration of the add node 10A to effectively solve the false restoration cases. The physical locations of the optical power monitoring devices 134A, 134B, 136A, and 136B, and the photo-detectors 128, 130A, 130B, 132A, and 132B are known and can be stored in a patch cable topology database 161 by a management layer and obtained when associations between cards is accomplished. At a step 162, the fault detection algorithm 160 receives data indicative of a scan by the optical power monitoring devices 134A, 134B, 136A, and 136B. The fault detection algorithm 160 then branches to a step 164 to analyze the data and determine whether or not any of the optical power monitoring devices 134A, 134B, 136A, and 136B is detecting an optical loss of signal. If not, the fault detection algorithm branches back to the step 162 to receive subsequent data from the optical power monitoring devices 134A, 134B, 136A, and 136B.

If the fault detection algorithm 160 determines that any of the optical power monitoring devices 134A, 134B, 136A, and 136B is detecting an optical loss of signal, the fault detection algorithm branches to a step 166 to determine whether an input tributary port of the routing card 60 is detecting an optical loss of signal. This can be determined by analyzing an output of the photodetector 128 located incident to the tributary port of the routing card 60. If the photodetector 128 is indicating an optical loss of signal, the fault detection algorithm 160 determines the presence of a failure at the source, and branches to a step 168 to insert the CSF enable signal to the OSC transmitter 142. If the input tributary port of the routing card 60 is indicating sufficient power (i.e., not in an optical loss of signal condition), the fault detection algorithm 160 branches to a step 170 to determine whether or not a failure at the source is occurring by analyzing the patch cable network configuration of the add node 10A to determine where the fault is being detected relative to the patch cables 106, 108, 130, 132, routing card 60, and multiplexers 124A, 124B, 126A, and 126B. In particular, the fault detection algorithm 160 determines whether or not the optical power monitoring device reporting the optical loss of signal is next to the routing card 60, i.e., the optical power monitoring device 134A, or 136A. If not, a failure at the source does not exist, and the fault detection algorithm branches to a step 172 to provide an FDI signal, for example, to the OSC transmitter 142. If the optical power monitoring device reporting the optical loss of signal is next to the routing card 60, then the fault detection algorithm 160 branches to a step 174 to determine whether the photodetector 130A, or 132A incident to the tributary input port of the multiplexer 124A or 126A is also reporting an optical loss of signal. If so, the fault detection algorithm 160 determines that a failure at the source does not exist, and branches to a step 176 to report an FDI to the OSC signaling controller 140. If the fault detection algorithm 160 determines at the step 174 that the photodetector 130A, or 132A incident to the tributary input port of the multiplexer 124A or 126A is not reporting an optical loss of signal, then the fault detection algorithm 160 concludes that one or more of the slices of the sliceable light source 120 has failed, and declares a failure at the source. The fault detection algorithm 160 then branches to the step 168 to insert the CSF enable to the OSC transmitter 142.

FIG. 12 is a partial block diagram of the add node 10A in which the optical supervisory channel signaling controller 140 is running the fault detection algorithm 160 of FIG. 11 to convert a superchannel optical loss of signal detected by an optical power monitoring device 124B into an FDI indication or a client signal failure declare signal in accordance with the present disclosure. As shown, the node 10A includes the patch cable network topology database 161 that includes a non-transitory computer readable medium that stores information indicative of order and location of the various components in the add node 10A, including the order and location of the routing card 60, the multiplexers 124A, 124B, 126A, and 126B, the optical power monitoring devices 134A, 134B, 136A, 136B, and the photo detectors 128. When a signal from one of the components is received by the OSC signaling controller 140, the OSC signaling controller 140 correlates the signal with the information within the patch cable network topology database 160 to determine the location of the component within the network topology of the add node 10A.

CONCLUSION

The problems caused by false restoration after a failure of a super channel at the source has occurred with a sliceable light source sourcing multiple super-channels simultaneously is fixed by monitoring (a) optical power monitoring devices for an optical loss of signal, and (b) photodetectors for sufficient light or optical loss of signal during a time period in which at least one of the optical power monitoring devices is detecting an optical loss of signal of only a portion of the bands, and (c) network topology information (including patch cable network configuration) within an add node to detect a failure at the source (when appropriate) and generate an FDI or a client signal failure signal. The client signal failure signal can be provided downstream in an optical supervisory channel to prevent false restoration of a failure at the source when the sliceable light source has failed.

The foregoing description provides illustration and description, but is not intended to be exhaustive or to limit the inventive concepts to the precise form disclosed. Modifications and variations are possible in light of the above teachings or may be acquired from practice of the methodologies set forth in the present disclosure.

Also, certain portions of the implementations may have been described as "components" or "circuitry" that performs one or more functions. The term "component" or "circuitry" may include hardware, such as a processor, an application specific integrated circuit (ASIC), or a field programmable gate array (FPGA), or a combination of hardware and software.

Even though particular combinations of features are recited in the claims and/or disclosed in the specification, these combinations are not intended to limit the disclosure. In fact, many of these features may be combined in ways not specifically recited in the claims and/or disclosed in the specification. Although each dependent claim listed below may directly depend on only one other claim, the disclosure includes each dependent claim in combination with every other claim in the claim set.

No element, act, or instruction used in the present application should be construed as critical or essential to the invention unless explicitly described as such outside of the preferred embodiment. Further, the phrase "based on" is intended to mean "based, at least in part, on" unless explicitly stated otherwise.

What is claimed is:

1. A node, comprising:
a light source generating multiple wavelengths of light composing multiple super channels, each of the multiple super channels being a group of the multiple wavelengths that are routed together through a first path;
a routing card having a first input port, a first photo detector at the first input port, and an output port, the first input port receiving the light and directing the multiple super channels of light composing the light of the one or more of the multiple super channels to the output port, the first photo detector generating a first signal indicative of only one of a presence or absence of the light of the multiple super channels;
a multiplexer having a second input port receiving the light of one or more of the multiple super channels from the routing card, a second photo detector at the second input port; and an optical power monitoring device, the optical power monitoring device receiving light of the one or more of the multiple super channels, measuring the light on a per band basis, and detecting an optical loss of signal within the one or more of the multiple super channels, the optical power monitoring device generating a second signal indicative of the optical loss of signal, the second photo detector generating a third signal indicative of only one of a presence or absence of the light of the one or more of the multiple super channels; and
a first patch cable connecting the light source to the first input port of the routing card;
a second patch cable connecting the output port of the routing card to the second input port of the multiplexer; and
a controller having circuitry executing a fault detection algorithm that receives the first signal, the second signal, and the third signal, receives information indicative of a patch cable network configuration of the first and second patch cables, and determines whether the optical loss of signal detected by the optical power monitoring device is a failure at the light source.

2. The node of claim 1, wherein the fault detection algorithm determines that the optical loss of signal detected by the optical power monitoring device is the failure at the light source by based upon the first signal indicating that the first photo detector is part of the routing card, and the first signal indicating the absence of the light of the multiple super channels.

3. The node of claim 1, wherein the fault detection algorithm determines that the optical loss of signal detected by the optical power monitoring device is the failure at the source based upon the third signal being indicative of the presence of the light of the one or more of the multiple super channels.

4. The node of claim 1, wherein the fault detection algorithm determines that the multiplexer is associated next to the routing card, and the third signal being indicative of the presence of the light of the one or more of the multiple super channels.

5. A transport network, comprising:
a first node;
a second node;
an optical fiber connecting the first node to the second node, the optical fiber having an optical supervisory channel;
wherein the first node comprises:
a light source generating multiple wavelengths of light composing multiple super channels, each of the multiple super channels being a group of the multiple wavelengths that are routed together through a first path;
a routing card having a first input port, a first photo detector at the first input port, and an output port, the first input port receiving the light and directing the multiple wavelengths of light composing the light of the multiple super channels to the output port, the first photo detector generating a first signal indicative of only one of a presence or absence of the light of the multiple super channels;
a multiplexer having a second input port receiving the light of the one or more of the multiple super channels from the routing card, a second photo detector at the second input port; and an optical power monitoring device, the optical power monitoring device receiving light of the one or more of the multiple super channels, measuring the light on a per band basis, and detecting an optical loss of signal within the one or more of the multiple super channels, the optical power monitoring device generating a second signal indicative of the optical loss of signal, the second photo detector generating a third signal indicative of only one of a presence or absence of the light of the one or more of the multiple super channels; and
a first patch cable connecting the light source to the first input port of the routing card;
a second patch cable connecting the output port of the routing card to the second input port of the multiplexer; and
a controller having circuitry executing a fault detection algorithm that receives the first signal, the second signal, and the third signal, receives information indicative of a patch cable network configuration of the first and second patch cables, and determines whether the optical loss of signal detected by the optical power monitoring device is a failure at the light source; and an optical supervisory channel transmitter receiving a signal indicative of the failure at the source, and inserting a client signal failure signal onto the optical supervisory channel of the optical fiber.

6. The transport network of claim 5, wherein the fault detection algorithm determines that the optical loss of signal detected by the optical power monitoring device is the failure at the light source by based upon the first signal indicating that the first photo detector is part of the routing card, and the first signal indicating the absence of the light of the one or more of the multiple super channels.

7. The transport network of claim 5, wherein the fault detection algorithm determines that the optical loss of signal detected by the optical power monitoring device is the failure at the source based upon the third signal being indicative of the presence of the light of the one or more of the multiple super channels.

8. The transport network of claim 5, wherein the fault detection algorithm determines that the multiplexer is associated next to the routing card, and the third signal being indicative of the presence of the light of the one or more of the multiple super channels.

* * * * *